(12) United States Patent
Lindquist

(10) Patent No.: US 10,377,294 B2
(45) Date of Patent: Aug. 13, 2019

(54) POCKET PROTECTION DEVICE FOR TRAILERS AND TRUCKS

(71) Applicant: Louis Guy Lindquist, Calgary (CA)

(72) Inventor: Louis Guy Lindquist, Calgary (CA)

( * ) Notice: Subject to any disclaimer, the term of this patent is extended or adjusted under 35 U.S.C. 154(b) by 0 days.

(21) Appl. No.: 15/827,249

(22) Filed: Nov. 30, 2017

(65) Prior Publication Data

US 2019/0160995 A1 May 30, 2019

(51) Int. Cl.
*B60P 7/08* (2006.01)
*B60R 13/01* (2006.01)
*B61D 3/08* (2006.01)
*E05C 19/18* (2006.01)
*B62D 33/02* (2006.01)

(52) U.S. Cl.
CPC .......... *B60P 7/0807* (2013.01); *B60R 13/013* (2013.01); *B61D 3/08* (2013.01); *B62D 33/0222* (2013.01); *E05C 19/184* (2013.01)

(58) Field of Classification Search
CPC ....... B61D 3/08; B60P 7/0807; B60R 13/013; B62D 33/0222; E05C 19/184
USPC .................................................. 296/39.2, 43
See application file for complete search history.

(56) References Cited

U.S. PATENT DOCUMENTS

| | | | | |
|---|---|---|---|---|
| 3,917,338 A * | 11/1975 | Becker | .................. | B60P 7/0815 105/423 |
| 4,253,785 A | 3/1981 | Bronstein | | |
| 4,358,232 A * | 11/1982 | Griffith | .................. | B60P 7/0838 24/136 K |
| 4,906,040 A * | 3/1990 | Edwards | .................. | B60R 13/01 24/297 |
| 5,098,147 A | 3/1992 | Benson | | |
| 5,141,277 A * | 8/1992 | Alexander | ............ | B60P 7/0807 296/43 |
| 5,326,203 A * | 7/1994 | Cockrell | ............ | B62D 33/0207 410/106 |
| 5,360,250 A * | 11/1994 | Wood | .................... | B60P 7/0807 296/39.2 |
| 5,513,934 A * | 5/1996 | German | .................. | B60R 13/01 24/297 |
| 5,823,601 A * | 10/1998 | Stanesic | .................. | B60R 13/01 296/41 |
| 6,309,006 B1 | 10/2001 | Rippberger | | |
| 6,536,827 B2 * | 3/2003 | Oswald | .................... | B60R 13/01 296/39.1 |
| 6,939,095 B1 * | 9/2005 | Hugg | .................... | B60P 7/0807 410/100 |
| 6,945,589 B2 * | 9/2005 | Quesenberry | ............ | B60J 7/106 296/100.02 |

(Continued)

FOREIGN PATENT DOCUMENTS

CA 1044729 12/1978

*Primary Examiner* — Pinel E Romain
(74) *Attorney, Agent, or Firm* — Brent Capehart

(57) ABSTRACT

A stake pocket protection device for providing protection to a stake pocket of the type commonly installed on trailer beds. The device having a planar base plate with an opening of dimensions approximate of the stake pocket, a retention portion and a securing portion in a J-shaped configuration. The device lies flat over the stake pocket with the opening lined up over the pocket such that a pin can slide into the stake pocket. Thereby the device holds the pin and adds more holding strength to the stake pocket.

10 Claims, 5 Drawing Sheets

(56) References Cited

U.S. PATENT DOCUMENTS

| | | | | |
|---|---|---|---|---|
| 7,431,548 B2* | 10/2008 | Acton | .................. | B60P 7/0807 |
| | | | | 410/103 |
| 7,513,726 B1* | 4/2009 | Comiskey, Jr. | ........... | B60P 3/40 |
| | | | | 296/3 |
| 7,665,768 B2* | 2/2010 | Duval | ................. | B62D 63/061 |
| | | | | 280/656 |
| 8,376,674 B1* | 2/2013 | Davis, III | ............. | B60P 7/0846 |
| | | | | 410/100 |
| 8,393,666 B1* | 3/2013 | Rhoton | ................ | B60P 7/0807 |
| | | | | 296/43 |
| 8,459,914 B2 | 6/2013 | Tatina | | |
| 8,613,578 B2* | 12/2013 | Hutchinson | ........ | A44B 13/0076 |
| | | | | 410/106 |
| 8,882,419 B2* | 11/2014 | Aguirre | ................ | B60P 7/0807 |
| | | | | 410/106 |
| 9,296,328 B1* | 3/2016 | Dewald | ................ | B60P 7/0815 |
| 9,308,854 B2* | 4/2016 | Miller | ................... | B60P 7/0807 |
| 9,630,548 B2* | 4/2017 | Marchlewski | ........ | B60P 7/0807 |
| 9,764,780 B2* | 9/2017 | Zehner | ................... | F16B 7/187 |
| 2014/0319298 A1* | 10/2014 | O'Regan | ................. | B60R 9/00 |
| | | | | 248/224.7 |
| 2016/0257312 A1 | 9/2016 | Veit | | |

* cited by examiner

POCKET PROTECTION DEVICE FOR TRAILERS AND TRUCKS

REFERENCE TO PENDING APPLICATIONS

This application does not claim the benefit of any issued U.S. patent or pending application.

BACKGROUND OF THE INVENTION

Field of the Invention

The present invention relates generally to cargo securing devices, and in particular to a device to protect a stake pocket commonly installed on a trailer or truck.

Background

Several types of truck cargo strap or chained securing methods are in use and known in the prior art. However, many of these devices are difficult to use, inefficient, or eventually cause damage to the stake pockets of a truck or trailer bed. These devices also require that the user throw a hook from one side of the truck, over the cargo load before cinching, winding up, or otherwise securing whatever type of cargo retaining means is used on the other side of the truck. The disclosed inventive concept includes a heavy-duty pocket protector to establish a secure, safe anchoring point at a plurality of stake pocket locations on the truck or trailer bed.

U.S. Pat. No. 8,393,666 issued to Rhoton, et. al. discloses A trailer or truck bed cargo retaining and pocket protector device for flatbed trailers, industrial trucks, and conestoga-style trucks is disclosed. The device includes a heavy duty steel channel orthogonally welded to a flat iron base plate, the finished unit dimensioned so as to fit within the interior of a trailer stake pocket. A length of ⅜ inch grade 70 steel transport chain is permanently attached to a retaining rod which is welded to the exterior of the base plate. In this manner, cargo loads may be more reliably, efficiently, and safely secured in place on the truck bed by means of connection of additional lengths of chain, strap, steel rope, etc., to opposite-sided stake pockets, wherein each such stake pocket contains a pocket protector device.

U.S. Pat. Pub. No. 20160257312 issued to Veit discloses a railroad gondola car may have stake pockets in which to mount stakes to permit a greater vertical envelope to be occupied by lading. The stake pockets are collapsible from a deployed position to a storage position. The stake pockets are mounted on doublers that mount to the side walls of the car in line with the side wall stiffeners and their associated cross-bearers. The connection between the stake pocket and the doubler is deliberately made weaker than the connection between the doubler and the side wall such that under abusive loading conditions the stake pocket may tend to shear off the doubler, and may tend thereby to leave the sidewall less damaged than might otherwise be the case.

CA Pat. No. 1044729 issued to Glassmeyer discloses a cap for a hollow stake of a highway cargo vehicle having a tarpaulin roof supported above the cargo bed of the vehicle by a plurality of stakes. The cap encloses the top of the stake to protect its interior from the elements and includes a fastening means which extends downwardly and is couplable with the inner portions of the hollow stake. The cap is provided with a bow socket portion which cooperates with a stake bow socket portion provided in the interior of the post to form a bow receiving socket for receiving a bow extend-ing through the protector cap into the hollow stake.

U.S. Pat. No. 4,253,785 issued to Bronstein discloses an edge protector and anchor member for the upper edge portion of the side wall of a pick-up truck box is formed as a generally U-shaped channel member. One leg of the member extends into the interior of the box to protect the upper inside portion of the side wall. The other leg extends downwardly on the outside of the side wall and has a plurality of spaced apart anchor means along the marginal edge thereof. Each anchor means comprises a tab flanked by notches struck from the leg with the tab being bent inwardly of the channel member. A rope or other tie-down device may be connected to the tabs for securing a load in the box.

U.S. Pat. No. 8,459,914 issued to Tatina discloses a lashing strap hook load securing system for securing a load on a load platform, the load platform has first and second pockets each having an open top and bottom and an end wall at sides of the platform. A lashing strap is provided with an associated strap winch for placement over the load on the load platform. First and second lashing strap hooks are provided, each lashing strap hook having a hook portion merging into a lashing strap retaining portion. The hook portion is shaped for engagement with an upper edge of the end wall of the respective pocket and comprises an outer bridging surface having a width at least equal to a width of the lashing strap and bounded at side edges by first and second respective guide surfaces extending above the outer bridging surface. The hook retaining portion comprises first and second retaining elements spaced apart to define a slot there between. The second retaining element is at an end of the retaining portion and the first retaining element is inwardly of the second retaining element. The first and second retaining elements and the slot are dimensioned to receive an end of the lashing strap threaded around each of the first and second retaining elements and inserted through the slot. With the hook having its retaining portion in a longitudinally extending vertical alignment, the lashing strap passes over and onto the bridging surface to assist in retaining the hook portion on the upper edge of the pocket.

U.S. Pat. No. 5,360,250 issued to Wood discloses a truck bed liner with rail protection which protects the horizontal top rail of a vertical cargo bed wall. The rail protector is integral with an upright surface of the liner and includes an upper portion, a lower portion, and a connecting portion. The upper portion extends away from the cargo bed and is spaced from the top rail. The lower portion is generally horizontal and extends outwardly and is substantially flush with the top rail. A vertically extending connecting portion connects the upper and lower portions and provides increased warpage resistance to the invention. A resilient load-bearing foam member, or a reinforcing plate oriented over a stake pocket and with securing means, is positioned inward of the vertically extending connecting portion and assists in maintaining the lower portion of the rail protector away from the top rail to reduce scuffing and damage to the top rail.

U.S. Pat. No. 5,098,147 issued to Benson discloses an apparatus for securing and releasing a stake in a stake pocket comprises a spring having a fastening end and a latch end. The fastening end is attached to an inside surface of the stake and the spring is biased such that the latch end positively engages the stake pocket. A selectively actuable release that effects the disengagement of the latch end of the spring from the pocket is also included. The release is disposed such that it may be actuated by a user's foot, when the user is standing at the level of the stake pocket in an upright position.

U.S. Pat. No. 6,309,006 issued to Rippberger discloses an attachment system attaches a structure or tonneau cover to a truck bed with side walls having stake pockets. Fastening plates are pivotally coupled to the structure or the belt rails of the tonneau cover. The plates pivotal between a first orientation in which the plates align with the stake pockets to pass therethrough, and a second orientation in which the plates rotate with respect to the first orientation to abut the stake pockets and secure the structure to the side walls of the truck bed. Tensioners can be coupled to the structure, and engage the fastening plates, to draw the fastening plates towards the structure. A cover can be removably attached to the belt rails to cover the truck bed.

BRIEF SUMMARY OF THE INVENTION

The inventive concept is directed toward a pocket protector device for use with stake pockets on flatbed trailers and trucks so equipped.

In one aspect, the device includes a body portion having a rectangular dimension and having an opening, otherwise known as a pin slot, therethrough; a retention portion on along one edge of the body portion; and a securing portion along the opposite side of the body from the retention portion.

In one aspect of its operation, the device sits on top of a stake pocket located along an outer rail of a flatbed trailer. The pin slot in the body of the device is lined up over the stake pocket such that the pocket pin can slide into the pocket. The securing portion of the device secures the inventive device to the flatbed portion of the trailer by locking the securing portion into a channel located between the outer rail and the flatbed portion of the trailer. A securing strap is used to secure the inventive device to the pocket pin. The securing strap wraps around the inventive device near the retention portion. The retention portion prevents the securing strap from disengaging from the inventive device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

FIG. 3 is an isometric side view of the embodiment of the device having a stake positioned there through.

DETAILED DESCRIPTION OF THE INVENTION

Figure 1:
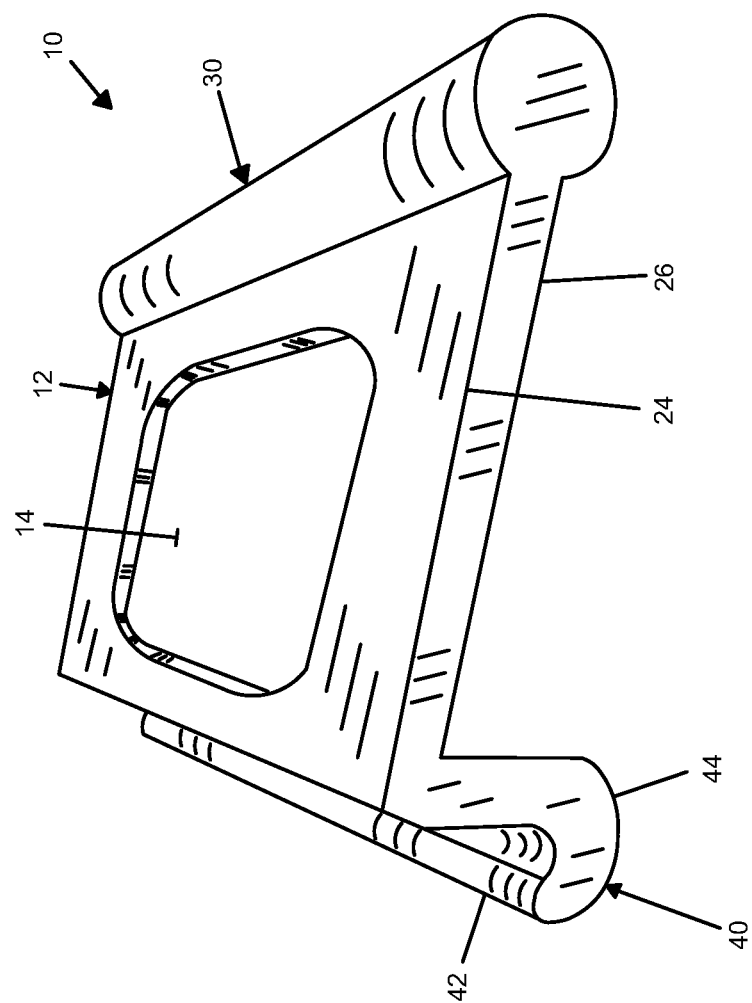
FIG. 1 is an isometric side view of the embodiment of the device.
Figure 2:
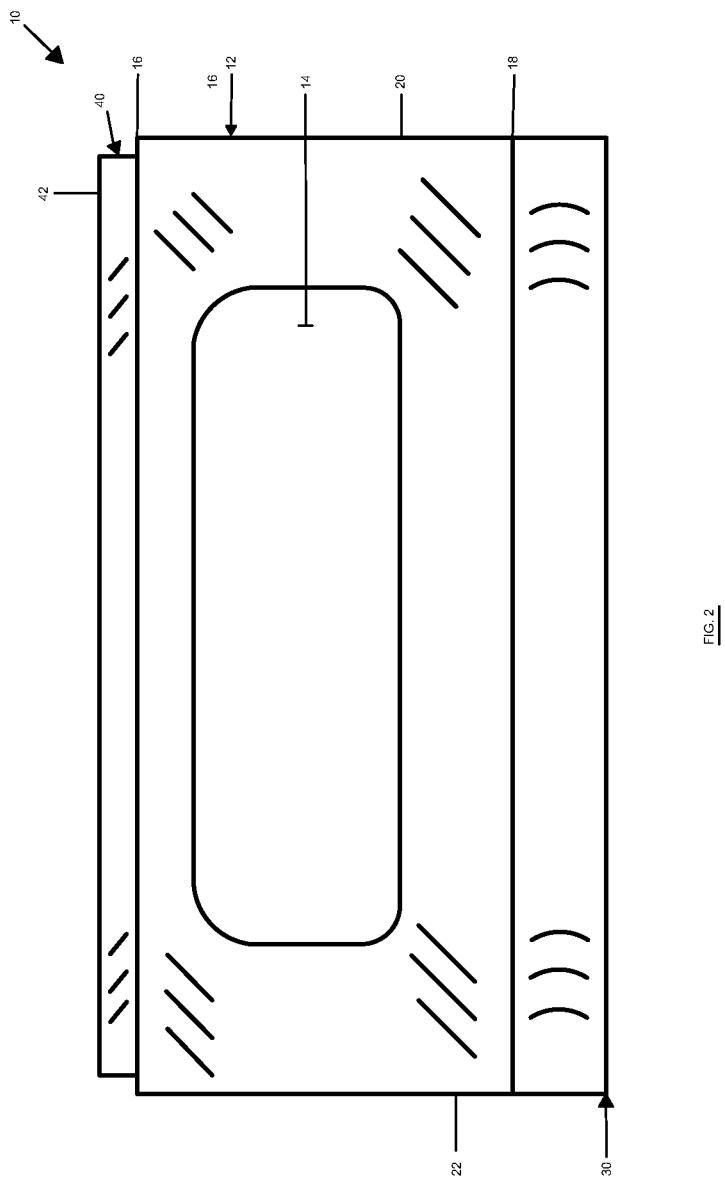
FIG. 2 is a top view of the embodiment of the device.
Figure 3:
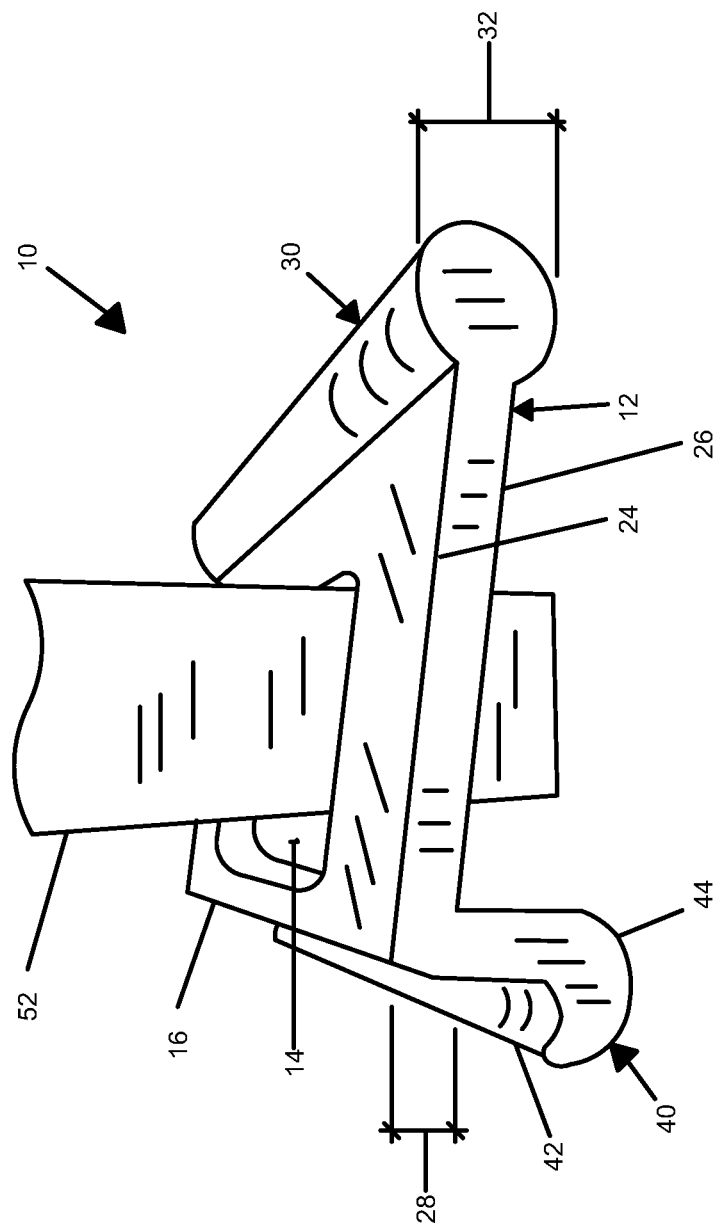

As illustrated in FIGS. 1-3, an embodiment of stake pocket protection device 10 is shown. Device 10 includes a planar base plate 12, a retaining portion 30 and a securing portion 40.

Base plate 12 includes a front wall 16, a back wall 18, a first side wall 20 and a second side wall 22. Further, base plate 12 includes an upper surface 24, an undersurface 26 and a base plate thickness 28 therebetween. In this embodiment, base plate 12 is essentially rectangular. This is illustrative and is not meant to be limiting. Those skilled in the art will recognize that other dimensions and shapes can be used and within the scope of the invention. Further, device 10 can be made from metal or other similar material.

Further, base plate 12 includes an opening 14. Opening 14 has the dimensions approximate of a stake pocket 56 such that a pin 52 may be inserted therethrough, see FIG. 3, and is located approximately in the geometric center of base plate 12 and has a quasi-rectangular shape, see FIG. 2. The shapes and dimensions of opening 14 are illustrative and are not meant to be limiting. Those skilled in the art will recognize that other shapes and dimensions can be used with various stake pockets, and as such are within the scope of this invention.

As illustrated in FIGS. 1-3, retention portion 30 extends along the length of and away from back wall 18. In this embodiment, retention portion 30 is circular and has a retention portion thickness 32 which is greater than base plate thickness 28. In this embodiment, retention portion 30 and base plate 12 are unitary. For purposes of this invention, unitary is defined as being constructed from the same piece of material. This is illustrative and not meant to be limiting. Further, in this embodiment, retention portion 30 is circular. This is also illustrative and not meant to be limiting.

As further illustrated in FIGS. 1-3, securing portion 40 extends along the most of the length of and away from front wall 16. In this embodiment, securing portion 40 is in a J-shaped configuration having an inner surface 42 and an outer surface 44

Figure 4:
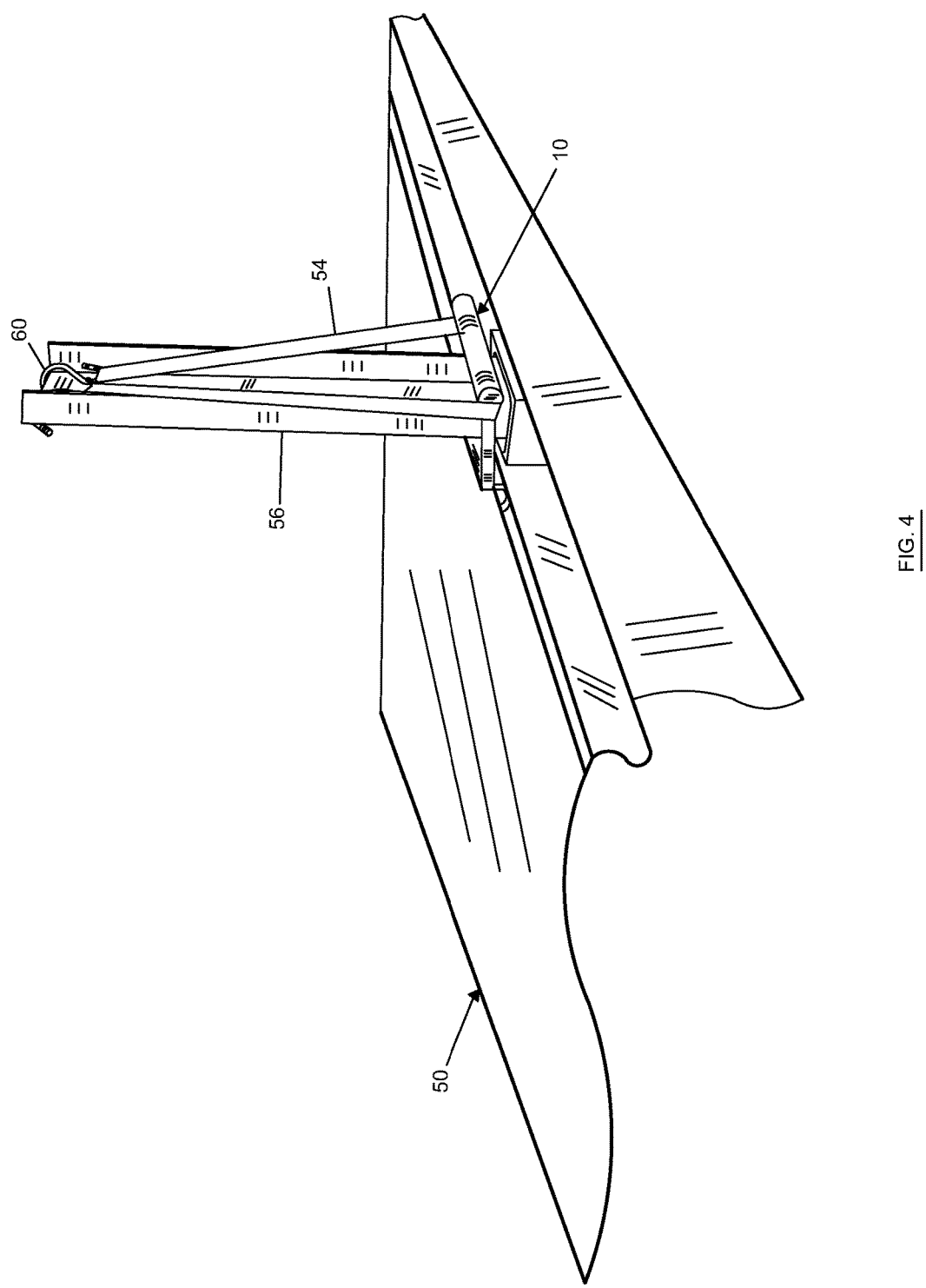
FIG. 4 is an isometric view of a trailer bed illustrating an embodiment of the inventive device connected on top of one of the stake pockets constructed on the side of the trailer.
Figure 5:
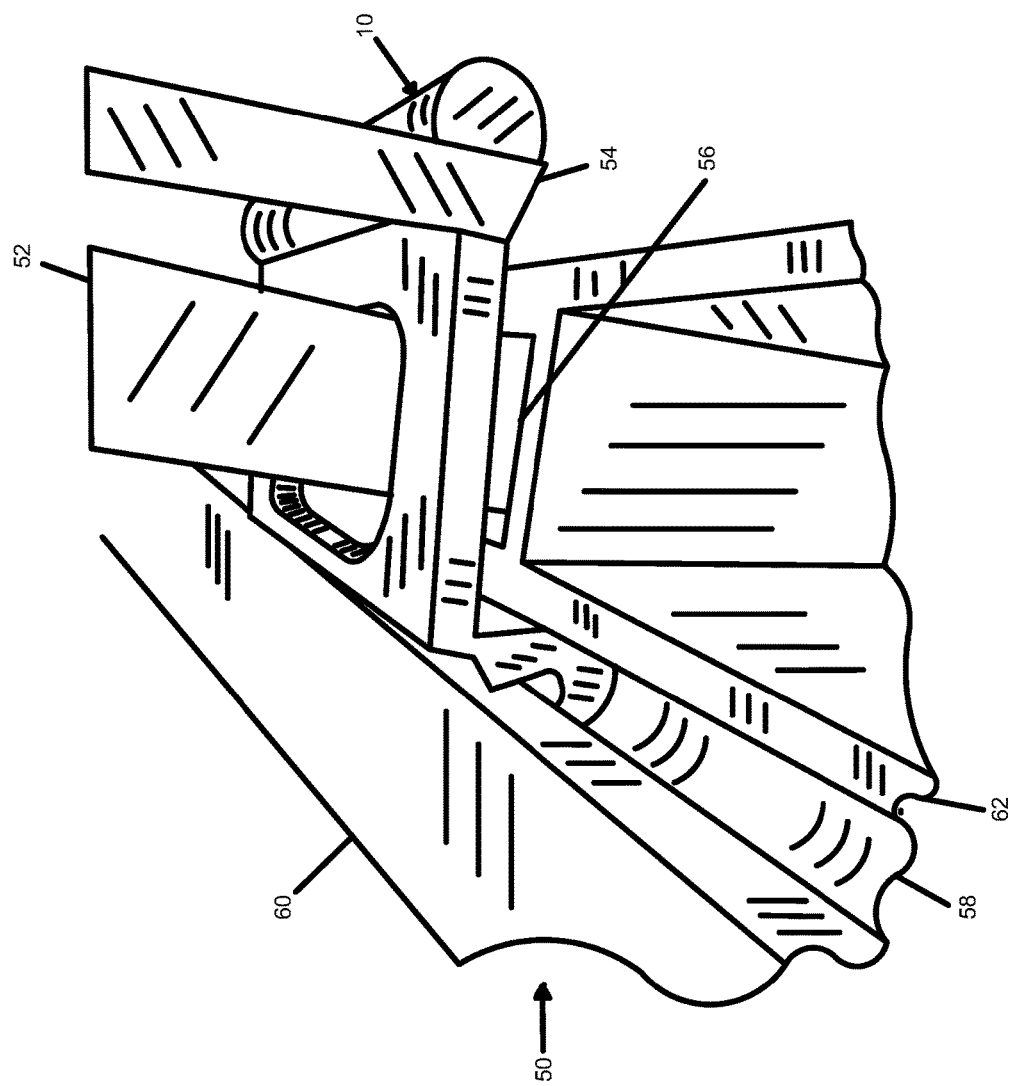
FIG. 5 depicts a close-up view of the embodiment of the device constructed on top of a stake pocket.

As illustrated in FIGS. 4 and 5, a truck trailer bed 50 with device 10 is shown. In this embodiment, the truck trailer bed is an aluminum trailer equipped with the j-lock type channel 58. Those skilled in the art will recognize this is illustrative and not meant to be limiting.

FIG. 4 illustrates an isometric view of the trailer bed 50 having pin 52 inserted through opening 14 and into stake pocket 56. A securing strap 54 is wrapped around base plate 12 proximate retention portion 30 and is secured to pin 52 by two S-hooks 60. FIG. 5 illustrates a close-up view of the relative positioning of the device 10 on top of stake pocket 56. FIG. 5 further illustrates device 10 being secured to trailer bed 60. In this embodiment, securing portion 40 secures device 10 to the flatbed portion 60 of trailer 50 by locking the securing portion 40 into channel 58 located between the outer rail 62 and the flatbed portion 60 of trailer 50.

In operation, device 10 is locked into position on top of a stake pocket 56 as shown in FIGS. 4 and 5. Pin 52 is placed through opening 14 and into stake pocket 56. Securing strap 54 is wrapped around base plate 12 near retention portion 30. Securing strap 54 is then securing to pin 52 by S-hooks 60. When securing straps 54 are secured to pin 52, device 10 is elevated slightly above stake pocket 56, as shown in FIG. 5. Pin 52 then engages the edge of opening 14. Device 10 is then capable of providing additional support for pin 52 while adding additional holding strength to the stake pocket 56.

While preferred embodiments of the present inventive concept have been shown and disclosed herein, it will be obvious to those persons skilled in the art that such embodiments are presented by way of example only, and not as a limitation to the scope of the inventive concept. Variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

I claim:

1. A stake pocket protection device for providing protection to a stake pocket of a type commonly installed on trailer beds, comprising:
   a planar base plate, having an upper surface, an undersurface and a base plate thickness therebetween, and further having a front wall having a front wall length, a back wall having a back wall length and a first and a second side wall, and further having an opening of dimensions approximate of the stake pocket;
   a retention portion extending away from the back wall, the retention portion having retention portion thickness greater than the base plate thickness, the retention portion extending approximately the length of the back wall length; and
   a securing portion extending away from the front wall.

2. The device of claim 1, wherein the base plate and the retention portion are unitary.

3. The device of claim 1, wherein the base plate is essentially rectangular.

4. The device of claim 1, wherein the base plate is metal.

5. The device of claim 1, wherein the retention portion is essentially circular.

6. The device of claim 1, wherein the securing portion extending approximately the length of the front wall length.

7. The device of claim 1, wherein the securing portion is in a J-shaped configuration.

8. A stake pocket protection device for providing protection to a stake pocket of a type commonly installed on trailer beds, comprising:
   an essentially rectangular, planar metal base plate, having an upper surface, an undersurface and a base plate thickness therebetween, and further having a front wall having a front wall length, a back wall having a back wall length and a first and a second side wall, and further having an opening of dimensions approximate of the stake pocket;
   an essentially circular retention portion extending away from the back wall, the retention portion having retention portion thickness greater than the base plate thickness, the retention portion extending approximately the length of the back wall length; and
   a securing portion extending away from the front wall, the securing portion extending approximately the length of the front wall length.

9. The device of claim 8, wherein the base plate and the retention portion are unitary.

10. The device of claim 8, wherein the securing portion is in a J-shaped configuration.

* * * * *